United States Patent [19]

Ulm et al.

[11] Patent Number: 5,676,620

[45] Date of Patent: Oct. 14, 1997

[54] CONTROL SYSTEM FOR A MOTOR VEHICLE

[75] Inventors: Michael Ulm, Alteglofsheim; Wolfgang Heinrich, Wiesent, both of Germany

[73] Assignee: Siemens Aktiengesellschaft, Munich, Germany

[21] Appl. No.: 562,032

[22] Filed: Nov. 22, 1995

[30] Foreign Application Priority Data

Nov. 24, 1994 [DE] Germany .................. 44 41 896.5

[51] Int. Cl.⁶ .................................................. B60K 41/04
[52] U.S. Cl. ................................. 477/115; 477/906
[58] Field of Search ................................ 477/115, 906

[56] References Cited

U.S. PATENT DOCUMENTS

| | | | |
|---|---|---|---|
| 4,935,872 | 6/1990 | Benford et al. | 477/115 X |
| 5,021,764 | 6/1991 | Mabee | 340/439 |
| 5,109,721 | 5/1992 | Boardman et al. | 477/906 X |
| 5,119,696 | 6/1992 | Yamaguchi | 477/109 |
| 5,315,897 | 5/1994 | Abe et al. | 477/115 X |
| 5,487,004 | 1/1996 | Amsallen | 477/115 X |
| 5,527,233 | 6/1996 | Tabata et al. | 477/906 X |
| 5,583,766 | 12/1996 | Birchenough et al. | 477/109 X |

*Primary Examiner*—Charles A. Marmor
*Assistant Examiner*—Peter T. Kwon
*Attorney, Agent, or Firm*—Herbert L. Lerner; Laurence A. Greenber

[57] ABSTRACT

A motor vehicle has an engine, an automatic transmission and a chassis. A control system for the motor vehicle includes a gear ratio change control system, an engine control system and a communications channel through which the gear ratio change control system and the engine control system communicate with one another. The gear ratio change control system has function units being dependent on data of the engine and the chassis and being integrated with the engine control system. A gear ratio change unit has function units being dependent on data of the transmission. The communications channel exchanges data required for controlling the transmission, between the engine control system and the gear ratio change unit. An emergency device switches-over the gear ratio change unit, upon a malfunction of the communications channel, to receive control signals from a device not communicating with it through the communications channel.

6 Claims, 2 Drawing Sheets

CONTROL SYSTEM FOR A MOTOR VEHICLE

BACKGROUND OF THE INVENTION

Field of the Invention

The invention relates to a control system for a motor vehicle having an automatic transmission, including a gear ratio change control system and an engine control system, which communicate with one another through a communications channel.

Such control systems, in a motor vehicle with an automatic transmission, include an engine control system and a transmission control system. Various versions thereof exist.

In a known integrated control system for the automatic transmission and the engine of a motor vehicle, the transmission is controlled by an independent control unit that is separate from the engine control system (U.S. Pat. No. 4,945,481).

A transmission control system must essentially perform the following functions:

shifting control, which assures gentle, non-wearing engagement of the various gears;

control of a torque conversion clutch;

a shifting logic that ascertains which gear is to be selected at a given time;

self-diagnosis; and basic functions, such as input and output functions.

Since the shifting transition control system must be constructed to be specific for a particular transmission, but the structure of the shifting logic depends on data of the engine and the chassis of the motor vehicle, among other factors, there are a large number of different variants in control for the various types of motor vehicle. Moreover, the expense for a cable harness between the transmission control system and the various valves and sensors in the transmission is quite high. According to Published International Patent Application WO 9505951, it has been possible to reduce the number of required variants in the control system, by integrating into the engine control system functional units of a gear ratio change control system that are dependent on data of the engine and the chassis of the motor vehicle, by accommodating function units dependent on data of the transmission in a gear ratio change unit of the transmission, and by exchanging the data required for controlling the transmission between the engine control system and the gear ratio change unit through the communications channel.

In such a control system, problems can arise in the rare cases when there is trouble in the communications channel for whatever reason, such as an electrical or mechanical error. In that case, among other effects, no information about the set-point gear ratio change can reach the gear ratio change unit, which in the worst case would cause the motor vehicle to stop even though the transmission is fully functional.

SUMMARY OF THE INVENTION

It is accordingly an object of the invention to provide a control system for a motor vehicle, which overcomes the hereinafore-mentioned disadvantages of the heretofore-known devices of this general type and which assures emergency operation of the control system, or in other words assures that if there is a failure or an error in a communications channel, a motor vehicle equipped with such a control system will remain functional and capable of being driven.

With the foregoing and other objects in view there is provided, in accordance with the invention, in a motor vehicle having an engine, an automatic transmission and a chassis, a control system for the motor vehicle, comprising a gear ratio change control system; an engine control system; a communications channel through which the gear ratio change control system and the engine control system communicate with one another; the gear ratio change control system having function units being dependent on data of the engine and the chassis and being integrated with the engine control system; a gear ratio change unit having function units being dependent on data of the transmission; the communications channel exchanging data required for controlling the transmission, between the engine control system and the gear ratio change unit; and an emergency device for switching-over the gear ratio change unit, upon a malfunction of the communications channel, to receive control signals from a device not communicating with it through the communications channel.

In accordance with another feature of the invention, the device to which the gear ratio change unit is connected upon a malfunction of the communications channel is a device reporting a turbine rpm of a torque converter of the transmission, and the gear ratio change unit controls a gear ratio change of the transmission for keeping the turbine rpm within an allowable rpm range.

In accordance with a further feature of the invention, the transmission is a multi-step transmission with a gearshift lever for selecting driving steps; the gear ratio change unit is connected to the shift lever upon a malfunction of the communications channel; and the gear ratio change unit evaluates signals of the shift lever being effected by a driver of the motor vehicle as shifting commands in the transmission.

In accordance with an added feature of the invention, the transmission has a typewriter-key control system; the gear ratio change unit is connected to the typewriter-key control system upon a malfunction of the communications channel; and the gear ratio change unit evaluates typewriter-key signals being input by a driver of the motor vehicle as commands for shifting or for changing a gear ratio of the transmission.

In accordance with an additional feature of the invention, the emergency device activates a display signaling a driver of the motor vehicle of a transition to manual control of a gear ratio.

In accordance with a concomitant feature of the invention, the communications channel exchanges parameters of the motor vehicle and of the transmission between the engine control system and the gear ratio change unit when an ignition is turned on, and the emergency device detects a malfunction of the communications channel if no signal from the engine control system reaches the gear ratio change unit within a predetermined time interval after the ignition is turned on.

The advantages of the invention reside in particular in the increased reliability and traffic safety of the motor vehicle equipped with it.

Other features which are considered as characteristic for the invention are set forth in the appended claims.

Although the invention is illustrated and described herein as embodied in a control system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
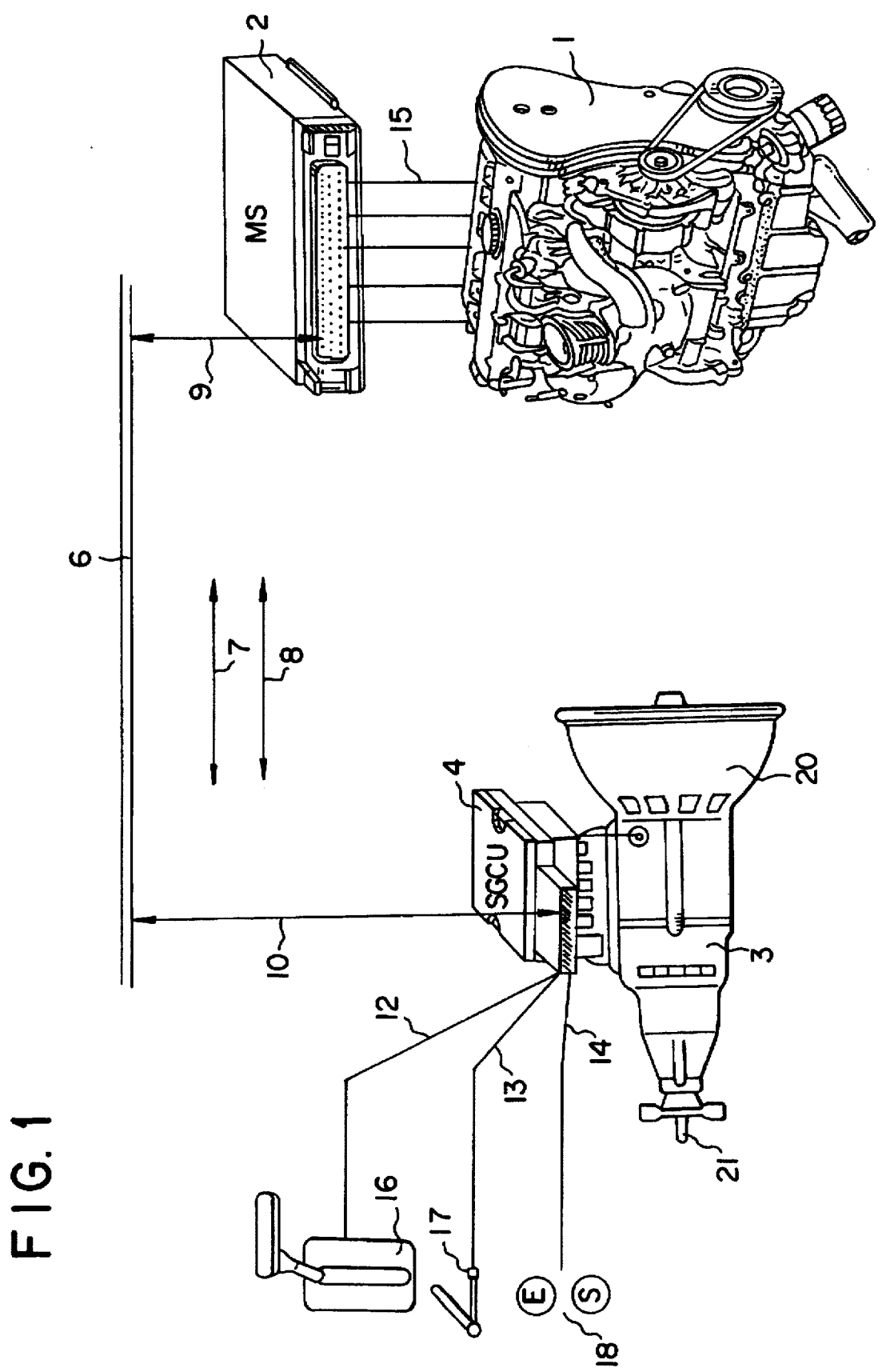
FIG. 1 is a schematic and diagrammatic perspective view of essential components of a motor vehicle drive system which is provided with a control system according to the invention.
Figure 2:
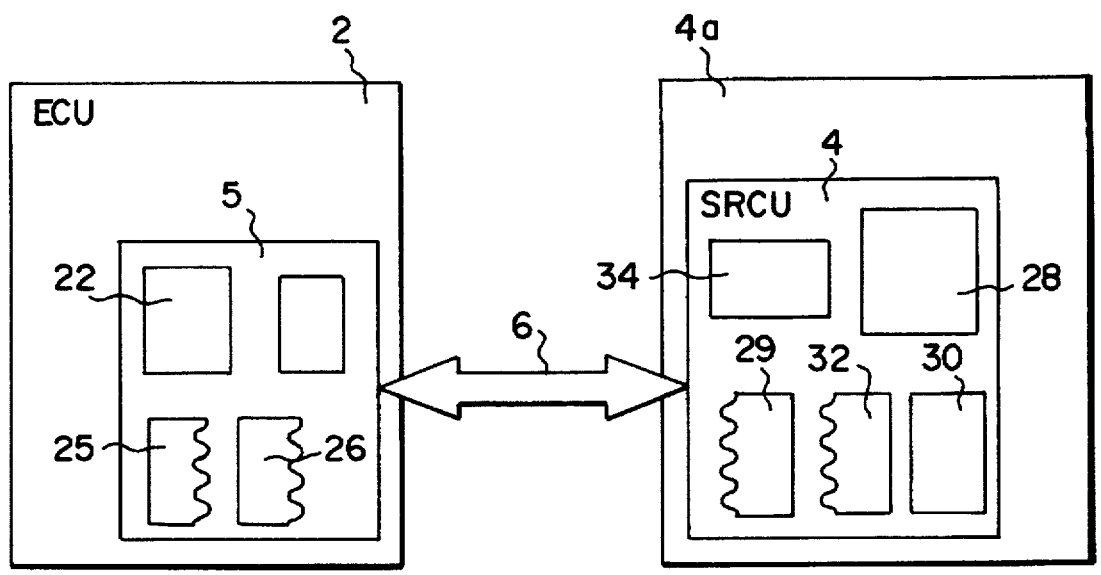
FIG. 2 is a block circuit diagram of the control system of the drive system of FIG. 1.

Referring now to the figures of the drawing in detail and first, particularly, to FIG. 1 thereof, there is seen an engine 1 which is controlled by an engine control system 2 and a transmission 3 which is controlled by a transmission control system 4a that is shown in FIG. 2 and is constructed as a gear ratio change unit 4. The engine control system 2 and the gear ratio change unit 4 are connected by a communications channel 6, which is in the form of a CAN bus, for instance. This bus is only schematically shown herein but it is well-known and is described in many publications.

Data, on one hand, which are used to choose gears and are indicated by an arrow 7, and configuration parameters, on the other hand, which serve to adapt to a particular motor vehicle and which are represented by an arrow 8, are exchanged between the engine control system 2 and the gear ratio change unit 4. Examples of the data transmitted over the communications channel 6 will be described later herein.

A bidirectional connection of the engine control system 2 to the communications channel 6 is schematically represented by a line 9. A likewise bidirectional connection of the gear ratio change unit 4 to the communications channel 6 is schematically represented by a line 10.

Through the use of signal lines 12, 13 and 14, a gearshift lever 16, a kickdown switch 17, and a driving program selection switch 18 are connected to the gear ratio change unit 4.

Through the use of these control elements, the driver sends his or her commands or wishes to the gear ratio change unit 4 in a known manner by selecting: various gear levels P, R, N, D, 2 and 1 through the gearshift lever 16, a demand for strong acceleration through the kickdown switch 17, and a choice between an "economy" and a "sport" driving program through the driving program selection switch 18.

The engine is connected to the engine control system 2 by control and signal lines 15. Through the use of the signal lines, sensor signals relating to the engine speed, engine temperature and other known operating parameters are transmitted from the engine 1 to the engine control system 2, and from there commands are transmitted to the engine 1 for controlling the ignition, the fuel injection quantity, the instant of injection, and possibly other known engine parameters.

For the sake of simplicity, the engine 1 and the transmission 3 are shown separately in this case, but it is well known that the power takeoff shaft of the engine 1 is connected directly to a torque converter 20 of the transmission 3. Accordingly, an output shaft 21 is also connected to a power takeoff train of the motor vehicle. A chassis, wheel suspensions, wheels, and other components of the motor vehicle are not shown in this case, because they are not affected by the invention and are well known.

Some of the function units of a transmission control system, which are chassis-specific or engine-specific or in other words which depend on data regarding the engine and the chassis of a motor vehicle, are integrated into the engine control system 2 and combined under reference numeral 5 in FIG. 2. These function units are: a shifting logic or shifting point selection control system 22, a driver or driving performance classification 24, a diagnostic circuit 25 and base modules 26, which perform data input and output procedures, for instance. The shifting logic 22 may be constructed as a fuzzy control system and in that case may also include the functions of driver or driving performance classification, road surface evaluation and dynamic shifting point correction (see Published European Patent Application 0 622 570).

The computer-controlled gear ratio change unit 4, which is also called an SRCU (smart ratio change unit), essentially includes only function units that are dependent on the data of the transmission. These are a shift flow control system 28, a diagnostic circuit 29 for actuators, a control system 30 of a TCC (torque converter clutch), and base modules 32 which, for instance, process signals of known sensors near the transmission, such as rpm sensors in the transmission, temperature and hydraulic pressure sensors in the transmission, and so forth.

The gear ratio change unit 4 also includes an emergency device 34, which in the event of a failure or a problem in the communications channel 6 recognizes the emergency and then carries out a switchover, with the effect that the gear ratio change unit receives control information from a device that is not connected to it, through the communications channel 6. Other devices which are suitable for this purpose will be described below.

The gear ratio change unit 4 ascertains that the communications channel 6 is malfunctioning through the use of one of the following methods. More than one of these methods may also be used jointly.

During a predetermined time interval $t_1$ after the ignition is switched on, the gear ratio change unit 4 does not receive an OK signal from the engine control system 2. This signal may include one of the engine, transmission or motor vehicle parameters referred to above.

Through the use of the gear ratio change unit, values for the turbine rpm of the torque converter 20 that are below a lower limit value $n_{T,min}$ or above an upper limit value $n_{T,max}$ are ascertained, in accordance with the inequalities $$n_T < n_{T,min}$$

and/or $$n_T > n_{T,max}$$

In this case, the gear ratio change unit 4 does not receive any gear ratio change command or set-point values from the engine control system, and therefore maintains a constant gear ratio to suit the most recently valid command value, even though the driver may, for instance, wish to drive especially slowly or especially fast. In the first case, with the torque converter clutch closed, the danger exists of stalling the engine, while in the latter case there is the danger of causing the engine to race. The lower and upper limit values $n_{T,min}$ and $n_{T,max}$ are limit values which are defined for the particular motor vehicle type. They are transmitted to the gear ratio change unit 4 by the engine control system 2 after the ignition has been turned on.

The gear ratio change unit 4 employs one of the known methods used for error detection in data networks in the motor vehicle, such as the method known as "time-stamping".

Once the emergency device 34 has ascertained that the communications channel 6 is malfunctioning, it switches the gear ratio change unit 4 over to the unimpeded reception of one of the following control signals. More than one of these options can also be used jointly.

a) The gear ratio change unit 4 controls the gear ratio change of the transmission 3 in such a way that the aforementioned turbine rpm limit values $n_{T,min}$ and $n_{T,max}$ or values derived from them will be adhered to, that is the values will not drop below them or exceed them, respectively. If the transmission 3 is constructed as a multi-step transmission, then the gear ratio change unit carries out downshifting to the next lower gear if the turbine rpm drops below the aforementioned lower limit value or a value derived from it.

b) The signals of the shift lever 16 (for instance: P, R, N, D, 4, 3, 2 and 1 in a five-speed transmission), which signals are present in a multi-step transmission, are delivered to the gear ratio change unit, which in this case could better be referred to as a gear changing device. The motor vehicle driver thus has the opportunity of controlling the gear ratio change by actuating the shift lever, so that he or she can continue to drive the vehicle.

In multi-step transmissions, which are known by the brand name "TIPTRONIC", that involve automatic transmissions which however can additionally be manually upshifted and downshifted with two typewriter-type keys, electrical signals of the typewriter-type keys are delivered to the gear ratio change unit, so that the transmission again remains controllable.

If the transmission is constructed as a stepless transmission, in accordance with a known proposal (in the publication entitled: Automobil Revue No. 32, Aug. 1, 1991, pages 29 and 31), which can also be controlled by typewriter-type keys, then once again the signals of these keys are used in an emergency as control signals for the gear ratio change unit.

The motor vehicle is expediently provided with a special signal light that is controlled by the emergency device and that signals this failure to the driver in the event of a failure of the communications channel 6. The driver can then carry out the control by hand as described above. In order to signal an emergency, a light may also be used that is, for instance, already generally present in motor vehicles which have an additional typewriter-key control, in order to signal the typewriter-key mode.

The gear ratio change unit 4 is constructed in such a way that only minimal chassis-dependent and engine-dependent parametrizing of its functions is necessary. In other words, it only needs to receive very few data from the chassis and the engine of the particular motor vehicle. Through the use of this division of functions between the engine control system 2 and the gear ratio change unit 4, the expense and complication of cabling between the engine control system, the gear ratio change unit, and the sensors and actuators, which are not shown herein because they are well known and are not modified by the invention, are greatly reduced.

The gear ratio change unit 4 is secured directly to the housing of the transmission 3 or is accommodated in that housing. It can therefore be supplied together with the transmission as a complete unit by the transmission manufacturer.

Status variables Z and control variables S are exchanged over the communications channel between the engine control system (ECS) 2 and the gear ratio change unit (GRCU) 4. Status variables Z are, for example, the actual engine moment $M_{eng,Act}$, which the engine control system transmits to the gear ratio change unit 4, and the actual gear ratio change $G_{act}$, which is reported to the engine control system by the gear ratio change unit. A control variable is, for instance, the value transmitted by the engine control system to the gear ratio change unit, for the command or set-point gear ratio change $G_{com}$. Other such variables are listed in the prior publications referred to at the outset above.

In addition to such a data exchange, parameters that are required for controlling the gear changing process can also be exchanged between the engine control system 2 and the gear ratio change unit 4 through the communications channel 6. These parameters are expediently transmitted as physical units. Examples of parameters to be transmitted are the vehicle mass and the wheel size (transmitted to the engine control system by the gear ratio change unit), the number of gears (in the case of a multi-step transmission) and the types of shifting (transmitted to the engine control system by the gear ratio change unit). "Types of shifting" in this case refer to the allowable gear changes, which are dependent on the particular transmission. For instance, downshifting from fifth gear to first or second gear and sometimes to third gear is not allowed in many transmissions.

It is advantageous that the gear ratio change unit 4 requires only a minimum of engine-specific and chassis-specific data, and that the engine control system 2 requires only a minimum of transmission-specific data. As a consequence, the gear ratio change unit need not be adapted in manufacture to different engine and chassis variants. The microprocessor or computer, which is contained in the gear ratio change unit but is not shown herein because it is well known, assures that an adaptation will be carried out using transmitted engine and chassis parameters. Another option is to store data sets for the various vehicle variants in memory in the gear ratio change unit 4 and to activate the particular data set for one of these variants through the use of a code word that is transmitted over the communications channel 6 to the gear ratio change unit 4.

In addition to the forwarding of physical parameters, status variables and control variables, it is also possible for identification information to be exchanged between the engine control system and the gear ratio change unit. The result which is attained is thus as follows:

If during repairs, for instance, components are replaced, then provision is made to ensure that through the communications channel 6, the components exchange identification data that are variant-specific or in other words that identify the motor vehicle type for which the particular component is suited. The other components or control units are then capable of ascertaining whether or not they can function with one another. In this way it can be determined whether or not a transmission which is unsuitable for that motor vehicle may have been installed by mistake, for instance.

Through the use of this exchange of control unit-specific identification data, an unauthorized replacement of components or devices can also be prevented. For instance, repair by unauthorized repair facilities and in particular the installation of stolen devices in a motor vehicle or of replacement components in a stolen vehicle are effectively prevented as a result. This also provides improved anti-theft protection.

We claim:

1. In a motor vehicle having an engine, an automatic transmission and a chassis, a control system for the motor vehicle, comprising:

a gear ratio change control system;

an engine control system;

a communications channel through which said gear ratio change control system and said engine control system communicate with one another;

said gear ratio change control system having function units being dependent on data of the engine and the chassis and being integrated with the engine control system;

a gear ratio change unit having function units being dependent on data of the transmission;

said communications channel exchanging data required for controlling the transmission, between said engine control system and said gear ratio change unit; and an emergency device for switching-over said gear ratio change unit, upon a malfunction of said communications channel, to receive control signals from a device not communicating with it through said communications channel.

2. The control system according to claim 1, wherein said device to which said gear ratio change unit is connected upon a malfunction of said communications channel is a device reporting a turbine rpm of a torque converter of the transmission, and said gear ratio change unit controls a gear ratio change of the transmission for keeping the turbine rpm within an allowable rpm range.

3. The control system according to claim 1, wherein the transmission is a multi-step transmission with a gearshift lever for selecting driving steps; said gear ratio change unit is connected to said shift lever upon a malfunction of said communications channel; and said gear ratio change unit evaluates signals of said shift lever being effected by a driver of the motor vehicle as shifting commands in the transmission.

4. The control system according to claim 1, wherein the transmission has a typewriter-key control system; said gear ratio change unit is connected to said typewriter-key control system upon a malfunction of said communications channel; and said gear ratio change unit evaluates typewriter-key signals being input by a driver of the motor vehicle as commands for shifting or for changing a gear ratio of the transmission.

5. The control system according to claim 1, wherein said emergency device activates a display signaling a driver of the motor vehicle of a transition to manual control of a gear ratio.

6. The control system according to claim 1, wherein said communications channel exchanges parameters of the motor vehicle and of the transmission between said engine control system and said gear ratio change unit when an ignition is turned on, and said emergency device detects a malfunction of said communications channel if no signal from said engine control system reaches said gear ratio change unit within a predetermined time interval after the ignition is turned on.

* * * * *